(12) United States Patent
Saitou

(10) Patent No.: US 8,157,529 B2
(45) Date of Patent: Apr. 17, 2012

(54) BLADE STRUCTURE OF TORQUE CONVERTER AND METHOD FOR PRODUCING BLADE STRUCTURE OF TORQUE CONVERTER

(75) Inventor: Kazumi Saitou, Numazu (JP)

(73) Assignee: Jatco Ltd, Fuji-shi (JP)

( * ) Notice: Subject to any disclaimer, the term of this patent is extended or adjusted under 35 U.S.C. 154(b) by 914 days.

(21) Appl. No.: 12/179,790

(22) Filed: Jul. 25, 2008

(65) Prior Publication Data
US 2009/0087315 A1 Apr. 2, 2009

(30) Foreign Application Priority Data
Sep. 28, 2007 (JP) ................................. 2007-253537

(51) Int. Cl.
*F16H 41/26* (2006.01)
(52) U.S. Cl. ................ 416/197 C; 416/182; 416/223 R
(58) Field of Classification Search ................ 416/182, 416/197 C, 223 R
See application file for complete search history.

(56) References Cited

U.S. PATENT DOCUMENTS

| | | |
|---|---|---|
| 3,224,079 A | 12/1965 | Dybvig |
| 5,996,391 A | 12/1999 | Mizobuchi |
| 6,036,439 A | 3/2000 | Mizobuchi et al. |
| 6,053,024 A | 4/2000 | Yoshida |
| 6,382,916 B1 | 5/2002 | Gomi et al. |
| 2004/0250594 A1 | 12/2004 | Schwenk |
| 2010/0037458 A1 | 2/2010 | Ranz et al. |

FOREIGN PATENT DOCUMENTS

| | | |
|---|---|---|
| JP | 07-004496 A | 1/1995 |
| JP | 9-42413 A | 2/1997 |
| JP | 11-006556 A | 1/1999 |

OTHER PUBLICATIONS

U.S. Appl. No. 12/179,756, filed Jul. 25, 2008, Saitou.
U.S. Appl. No. 12/179,772, filed Jul. 25, 2008, Saitou.
Kazumi Saitou, U.S. PTO Office Action, U.S. Appl. No. 12/179,756, dated Aug. 3, 2011, 12 pages.
Kazumi Saitou, U.S. PTO Notice of Allowance and Allowability, U.S. Appl. No. 12/179,772, dated Aug. 5, 2011, 6 pages.
K. Saitou, U.S. PTO Office Action, U.S. Appl. No. 12/179,772, dated Mar. 21, 2011, 10 pages.
K. Saitou, U.S. PTO Notice of Allowance, U.S. Appl. No. 12/179,756; dated Nov. 7, 2011, 6 pages.

*Primary Examiner* — Alexander Ghyka
(74) *Attorney, Agent, or Firm* — Foley & Lardner LLP

(57) ABSTRACT

A blade structure of a torque converter, having a plurality of blades, is produced according to processes. The processes has (a) stamping a plane plate into a first shape, the first shape has (i) the plurality of circumferentially arranged blades, (ii) ring-shaped first connecting portions, each of which integrally couples the adjacent blades together at an outer circumference side of the blade structure, and (iii) ring-shaped second connecting portions, each of which integrally couples the adjacent blades together at an inner circumference side of the blade structure, (b) curving a surface of the stamped blade, (c) inclining the blade at a predetermined angle with respect to the first and second connecting portions while inclining the first and second connecting portions, and (d) adjusting a distance between the adjacent blades and shrinking the first shape in a radial direction by the inclination of the first and second connecting portions.

4 Claims, 10 Drawing Sheets

VIEW A

VIEW B

DETAIL E

VIEW A

VIEW B

BLADE STRUCTURE OF TORQUE CONVERTER AND METHOD FOR PRODUCING BLADE STRUCTURE OF TORQUE CONVERTER

BACKGROUND OF THE INVENTION

The present invention relates to a blade structure of a torque converter and a method for producing the blade structure of the torque converter.

The torque converter has a plurality of bladed members (blades) in a fluid-filled shell for transferring power through the fluid. These blades are generally installed and fixed to the shell one by one. Thus this installation work is inefficient, and causes the increase in assembly time.

For this problem, Japanese Patent Provisional Publication No. 9-042413 (hereinafter is referred to as "JP9-042413") has disclosed a method for producing a blade member having a plurality of the blades which are integrally connected with each other by stamping the blades from one steel plate or sheet.

SUMMARY OF THE INVENTION

In the above method to produce the blade member in JP9-042413, it could be possible to shorten the assembly or working time. However, in JP9-042413, the one rectangular steel plate, in which the plurality of stamped blades are formed, is curved so that its shape becomes a ring shape. More specifically, upper and lower sides of the rectangular steel plate are respectively folded or bent by mutually different fold amounts, then a curved blade member (i.e. a ring shaped blade member) is produced. Regarding this folding process, the fold amounts of the upper and lower sides of the rectangular steel plate are accurately set, and each connecting portion between the stamped blades is folded by the accurately set amount by a computer-controlled robot. Thus, a sophisticated folding or bending process is required. In addition, this folding process has to be carried out for each of the connecting portions of the blade. In other words, this folding operation has to be performed for the each connecting portion one by one. Hence, although the production time of the blade might be shortened through the method of JP9-042413, the process in JP9-042413 is inefficient and the working efficiency is not necessarily high.

It is therefore an object of the present invention to provide a blade structure, of a torque converter, where a plurality of blades are integrally formed with each other by a stamping process etc. and which can be easily and promptly produced.

According to one aspect of the present invention, a blade structure of a torque converter, having a plurality of blades circumferentially arranged at a predetermined distance, the blade structure produced according to processes comprises: (a) stamping a plane plate into a first shape, the first shape has: (i) the plurality of circumferentially arranged blades; (ii) ring-shaped first connecting portions, each of which integrally couples the adjacent blades together at an outer circumference side of the blade structure; and (iii) ring-shaped second connecting portions, each of which integrally couples the adjacent blades together at an inner circumference side of the blade structure; (b) curving a surface of the stamped blade between the first and second connecting portions; (c) inclining the blade having the curved surface at a predetermined angle with respect to the first and second connecting portions while inclining the first and second connecting portions with respect to a horizontal plane of the plane plate; and (d) adjusting a distance between the adjacent blades and shrinking the first shape in a radial direction by the inclination of the first and second connecting portions.

According to another aspect of the present invention, a method for producing a blade structure of a torque converter, having a plurality of blades circumferentially arranged at a predetermined distance, the method comprises: (a) stamping a plane plate into a first shape, the first shape has (i) the plurality of circumferentially arranged blades; (ii) ring-shaped first connecting portions, each of which has a deformable first adjustment portion and a first arc portion, the first adjustment portion having first and second branch portions which are integrally coupled with the blade and integrally couple the adjacent first arc portions together, at an outer circumference side of the blade structure; and (iii) ring-shaped second connecting portions, each of which has a deformable second adjustment portion and a second arc portion, the second adjustment portion having third and fourth branch portions which are integrally coupled with the blade and integrally couple the adjacent second arc portions together, at an inner circumference side of the blade structure; (b) curving a surface of the stamped blade between the first and second connecting portions; (c) inclining the blade having the curved surface at a predetermined angle with respect to the first and second connecting portions while overlapping the first and second branch portions and the third and fourth branch portions respectively in a circumferential direction and inclining the first and second arc portions with respect to a horizontal plane of the plane plate at the respective circumference sides; and (d) adjusting a distance between the adjacent blades and shrinking the first shape in a radial direction by the overlap of the first and second branch portions and the third and fourth branch portions and the inclination of the first and second arc portions.

The other objects and features of this invention will become understood from the following description with reference to the accompanying drawings.

DETAILED DESCRIPTION OF THE INVENTION

Embodiments of a blade structure and a blade structure-producing method will be explained below with reference to the drawings.

Figure 1:
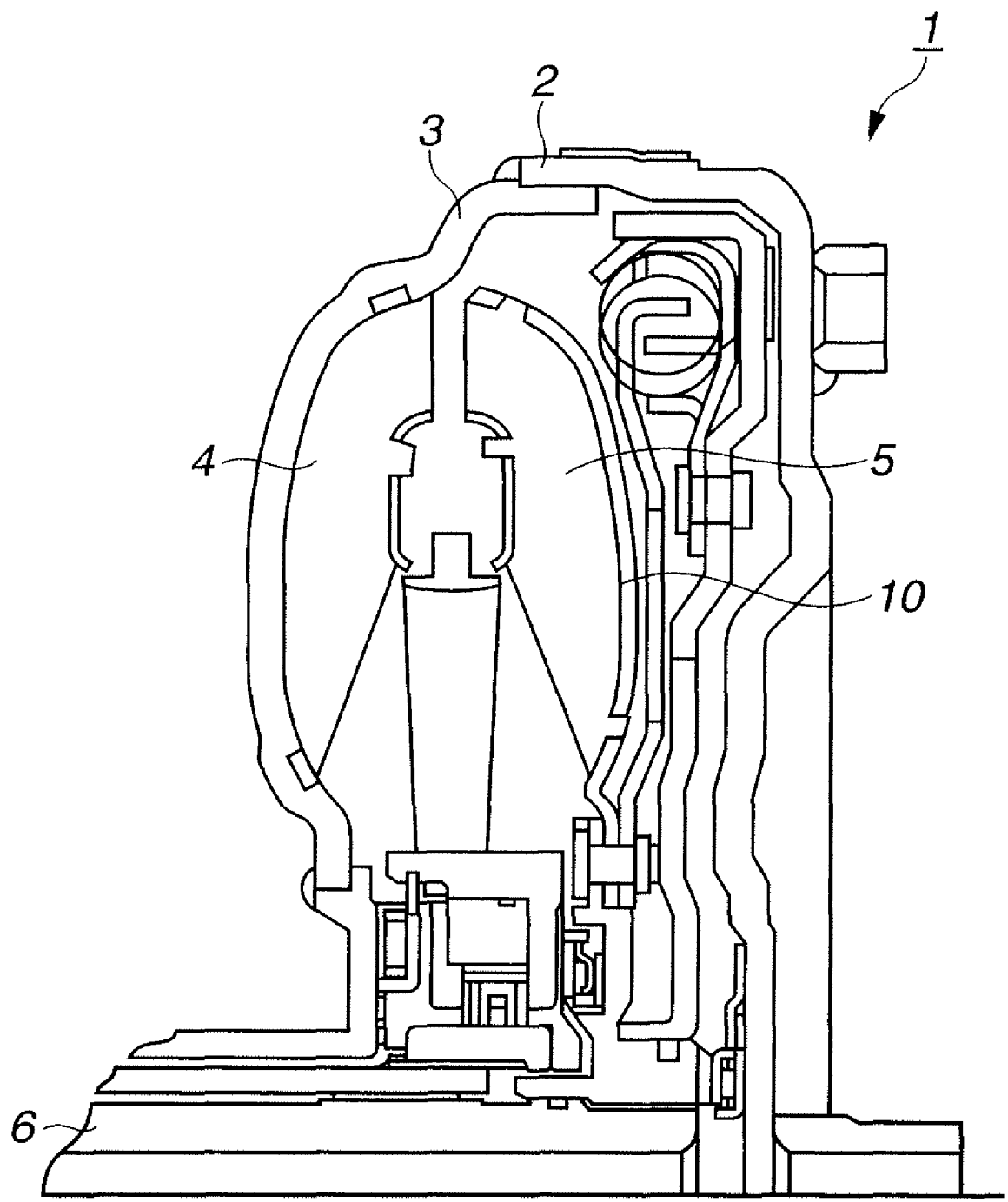
FIG. 1 is a schematic view showing a torque converter of the present invention.

Now, a configuration of a torque converter 1 of the present invention will be explained with reference to FIG. 1. A torque converter 1 is a hydraulic coupling, which is installed between an engine and an automatic transmission of a vehicle.

Torque converter 1 has a front cover 2, a rear cover 3, a pump impeller 4 installed in an inner wall of rear cover 3, a turbine runner 5 facing pump impeller 4, and an output shaft 6. Rear cover 3 is fixed to front cover 2, and when front cover 2 rotates by rotation from the engine (not shown), rear cover 3 rotates together with front cover 2. On the other hand, when turbine runner 5 rotates, its rotation is transferred to the automatic transmission (not shown) through output shaft 6.

Turbine runner 5 has a substantially ring-shaped turbine shell (shell member) 10 and a blade structure 11 which is installed and fixed to turbine shell 10.

Figure 2:
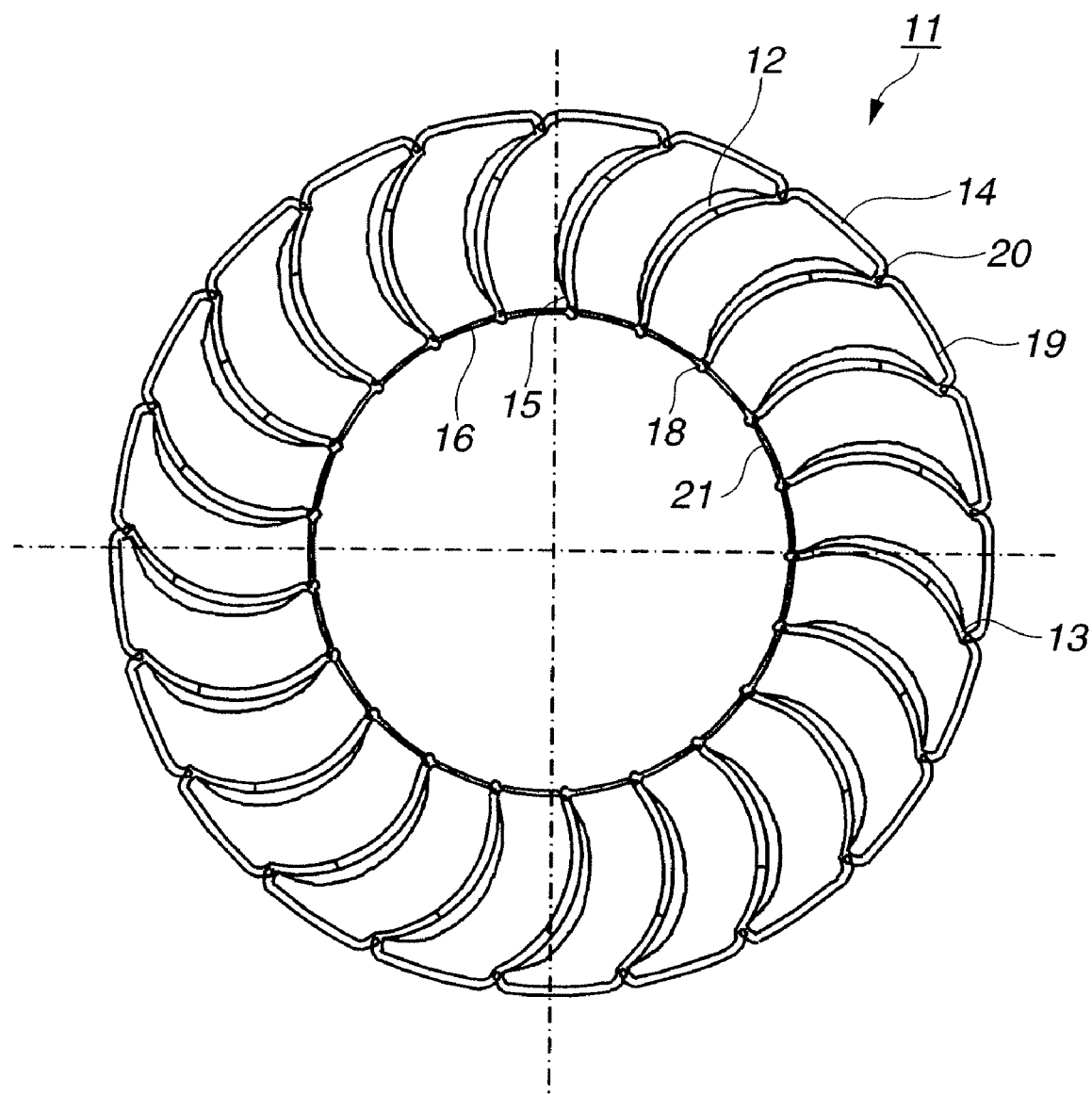
FIG. 2 is a front view of a blade structure, viewed from a pump impeller.

Here, a detail of the blade structure 11 will be explained with reference to FIG. 2. The whole of the blade structure 11 is substantially annular in shape, and a plurality of blades 12 are arranged at a predetermined interval in a circumferential direction.

Blade structure 11 has the plurality of the circumferentially arranged blades 12, a ring-shaped first connecting portion 14 which is connected with an inner wall of turbine shell 10 and integrally coupled to blade 12 through a first adjustment portion 20 at an outer circumference side of the ring-shaped blade structure 11, and a ring-shaped second connecting portion 16 which is connected with the inner wall of turbine shell 10 and integrally coupled to blade 12 through a second adjustment portion 18 at an inner circumference side of blade structure 11.

With regard to the blade 12 and first connecting portion 14 and second connecting portion 16, they are formed from a single metal plate (the detail thereof will be described later).

First connecting portion 14 has the first adjustment portion 20 which couples blade 12 with first connecting portion 14 and an arc-shaped first arc portion 19 which couples the adjacent first adjustment portions 20 together.

As described later with reference to FIG. 5, first adjustment portion 20 has a first branch portion 22 and a second branch portion 23. These first and second branch portions 22 and 23 are bent or folded in the circumferential direction in a producing process, thereby adjusting a distance between adjacent blades 12 and adjusting a diameter of first connecting portion 14 as well at the outer circumference side.

As for the second connecting portion 16, it has the second adjustment portion 18 which couples blade 12 with second connecting portion 16 and an arc-shaped second arc portion 21 which couples the adjacent second adjustment portions 18 together.

Second adjustment portion 18 has a third branch portion 24 and a fourth branch portion 25. In the same manner as the first and second branch portions 22, 23, these third and fourth branch portions 24 and 25 are bent or folded in the circumferential direction in the producing process, thereby adjusting a distance between adjacent blades 12 and adjusting a diameter of second connecting portion 16 as well at the inner circumference side.

Figure 4A:
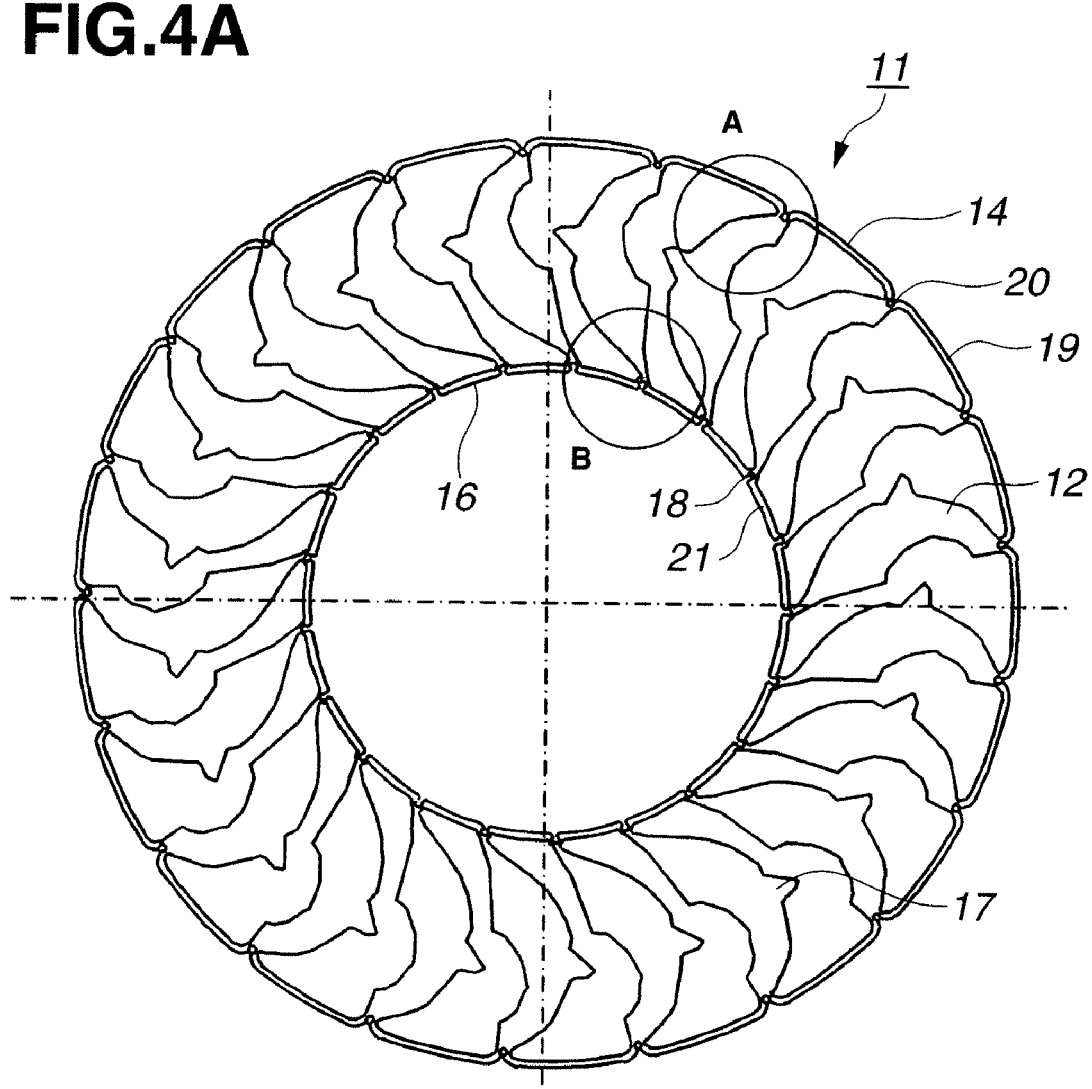
FIGS. 4A and 4B are respectively a front view of the blade structure and its sectional view.
Figure 4B:

Here, as shown in FIG. 4, blade 12 has a protrusion 17 which is fitted into a groove that is provided in turbine shell 10. Further, blade 12 is formed into such curved shape that a desired fluid flow can be produced in torque converter 1, and is secured to turbine shell 10 at a predetermined angle with respect to the turbine shell 10. When protrusion 17 is fitted into the groove, a position of blade 12 in radial and circumferential directions of turbine shell 10 is settled, and the adjacent blades 12 are arranged at the predetermined distance. Protrusion 17 serves to settle the position of blade 12 with respect to turbine shell 10.

First connecting portion 14 and second connecting portion 16 are welded to turbine shell 10, and blade 12 positioned by protrusion 17 is fixed to turbine shell 10 through soldering, then blade structure 11 is secured to turbine shell 10.

Regarding a fixing manner through which first and second connecting portions 14 and 16 and blade 12 are fixed to turbine shell 10, it is not limited to the above welding and soldering. Any fixing manner is possible as long as blade structure 11 can be fixed to turbine shell 10 while holding performance of the torque converter 1.

As described above, since blade 12 is integrally formed with first and second connecting portions 14 and 16 through first and second adjustment portions 20 and 18 and then blade structure 11 is constructed by such blade 12, it is possible to install and fix the plurality of the blades 12 to turbine shell 10 at once. Further, when blade structure 11 is installed to turbine shell 10, the positioning of blade 12 with respect to the groove of turbine shell 10 is easily achieved.

Next, the producing process of the blade structure 11 will be explained with reference to FIGS. 3 to 8.

Figure 3:
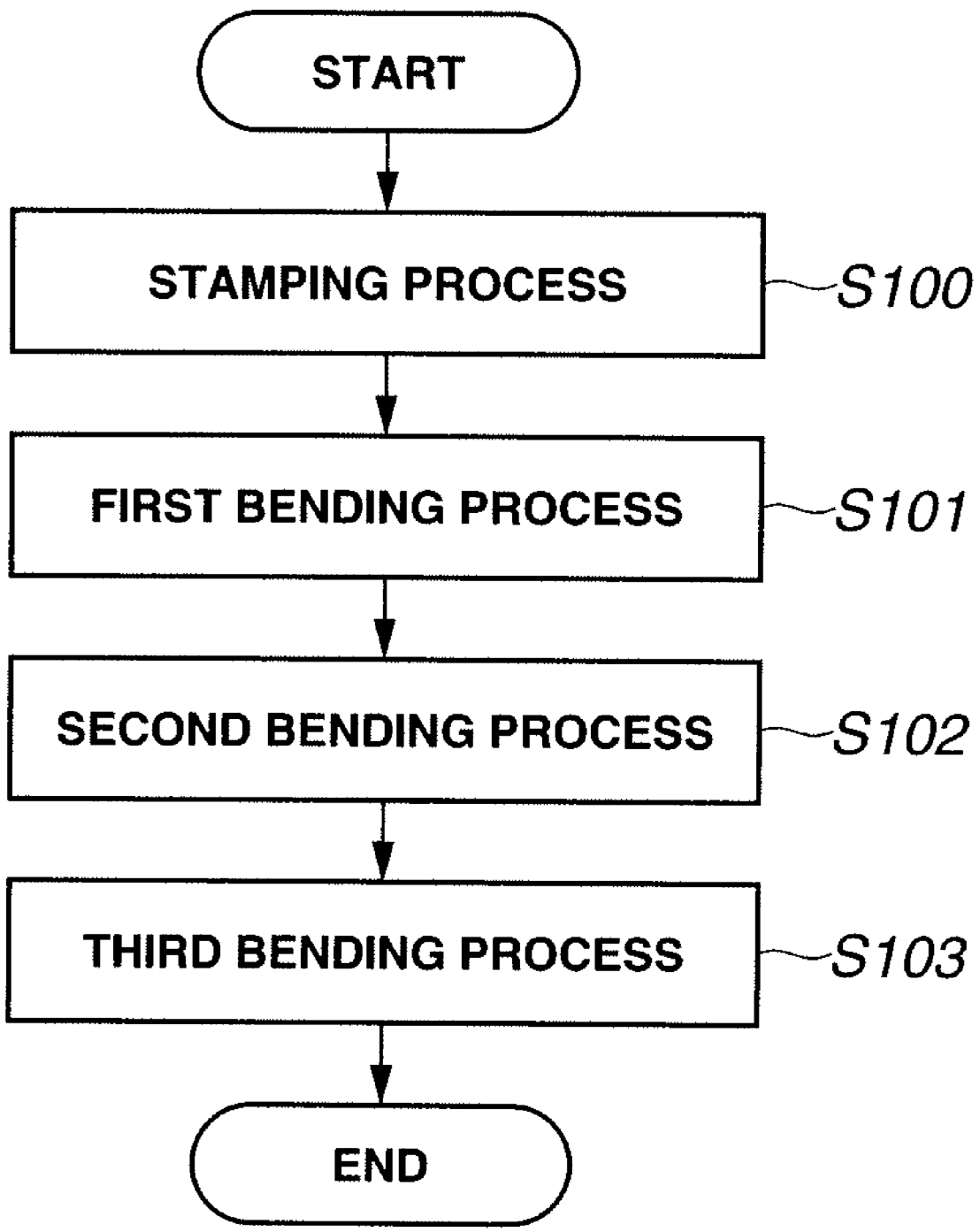
FIG. 3 is a flow chart showing a producing process of the blade structure.

FIG. 3 is a flow chart that shows the producing process of the blade structure 11. FIGS. 4 to 8 are front views and sectional views of blade structure 11 for each process step.

First, in FIG. 3, at step S100, a stamping process is performed. In this process, as shown in FIG. 4A, a single plane metal plate or sheet is stamped into a plate member (a first shape). The plate member has first connecting portion 14, second connecting portion 16 and blade 12 etc. That is, these first and second connecting portions 14, 16 and blade 12 etc. are integrally stamped from the single plane metal plate.

As can be seen in FIG. 4A, in the plate member, the ring-shaped second connecting portions 16, the plurality of the blades 12 circumferentially arranged at the predetermined distance, and the ring-shaped first connecting portions 14, are formed from the inner circumference side towards the outer circumference side in the radial direction.

Furthermore, first adjustment portion 20 formed at the outer circumference side has a substantially V-shaped portion which resembles angle brackets (<<) and opens outwards in the radial direction of blade structure 11. Second adjustment portion 18 formed at the inner circumference side also has the substantially V-shaped portion which resembles the angle brackets (<<) and opens inwards in the radial direction of blade structure 11.

Figure 5A:
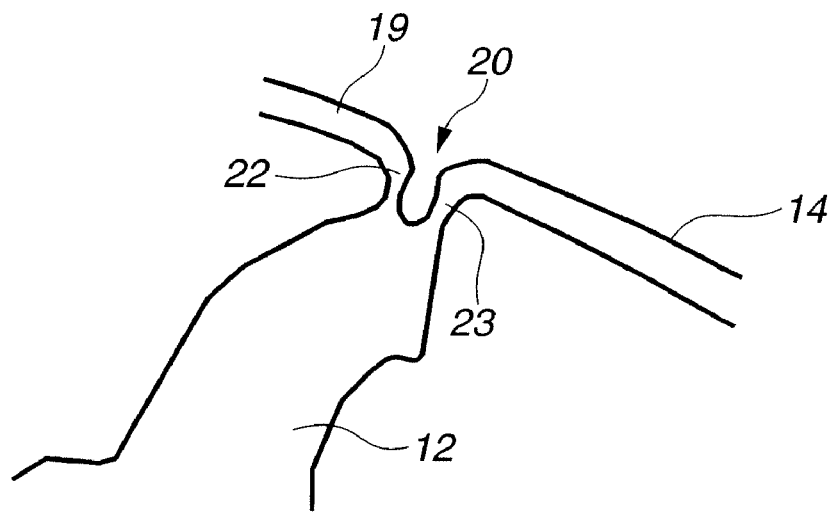
FIGS. 5A and 5B are detail drawings of a first connecting portion and a second connecting portion respectively.
Figure 5B:
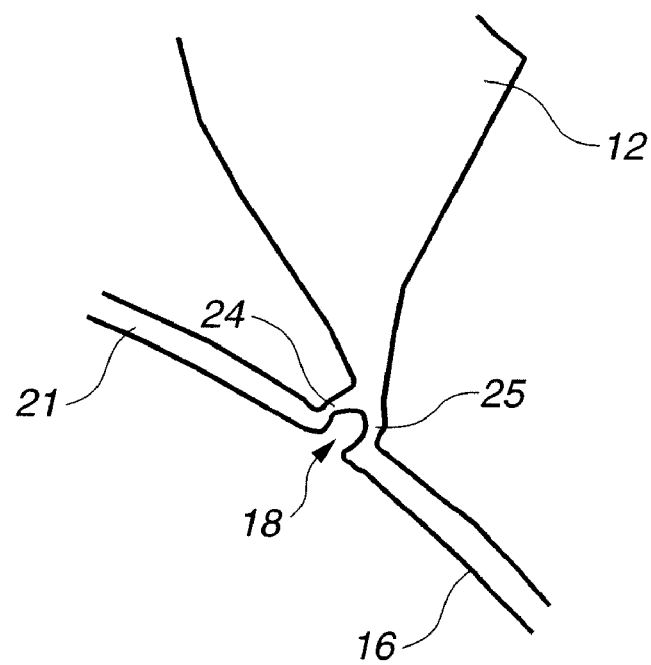

In FIGS. 5A and 5B, the detail front views of first adjustment portion 20 and second adjustment portion 18 are illustrated. FIG. 5A is an enlarged view of a circle "A" in FIG. 4. FIG. 5B is an enlarged view of a circle "B" in FIG. 4.

As shown in FIG. 5A and mentioned above, first adjustment portion 20 has first branch portion 22 and second branch portion 23. First adjustment portion 20 is substantially shaped like the letter "V" opening outwards in the radial direction by these first and second branch portions 22 and 23. Here, in first adjustment portion 20, first and second branch portions 22 and 23 are respectively located at left and right side in a clockwise direction of first connecting portion 14.

As for the second adjustment portion 18, as shown in FIG. 5B, second adjustment portion 18 has third branch portion 24 and fourth branch portion 25. Second adjustment portion 18 is substantially shaped like the letter "V" opening inwards in the radial direction by these third and fourth branch portions 24 and 25. Here, in second adjustment portion 18, third and fourth branch portions 24 and 25 are respectively located at left and right side in a clockwise direction of second connecting portion 16.

In an after-mentioned second bending process at step S102, first adjustment portion 20 is folded or bent so that first and second branch portions 22 and 23 overlap one another. Second adjustment portion 18 is folded or bent so that third and fourth branch portions 24 and 25 overlap one another.

Further, in an after-mentioned third bending process at step S103, first adjustment portion 20 is folded or bent so that first and second branch portions 22 and 23 become close to each other. Second adjustment portion 18 is folded or bent so that third and fourth branch portions 24 and 25 become close to each other.

At step S101, a first bending process is performed. In this process, by pressing blade 12 using a mold or die, blade 12 is bent and is formed into a desired shape (refer to FIGS. 6A and 6B). Through this process, blade 12 takes a shape obtained at a time when blade structure 11 is installed and fixed to turbine shell 10.

Figure 6A:
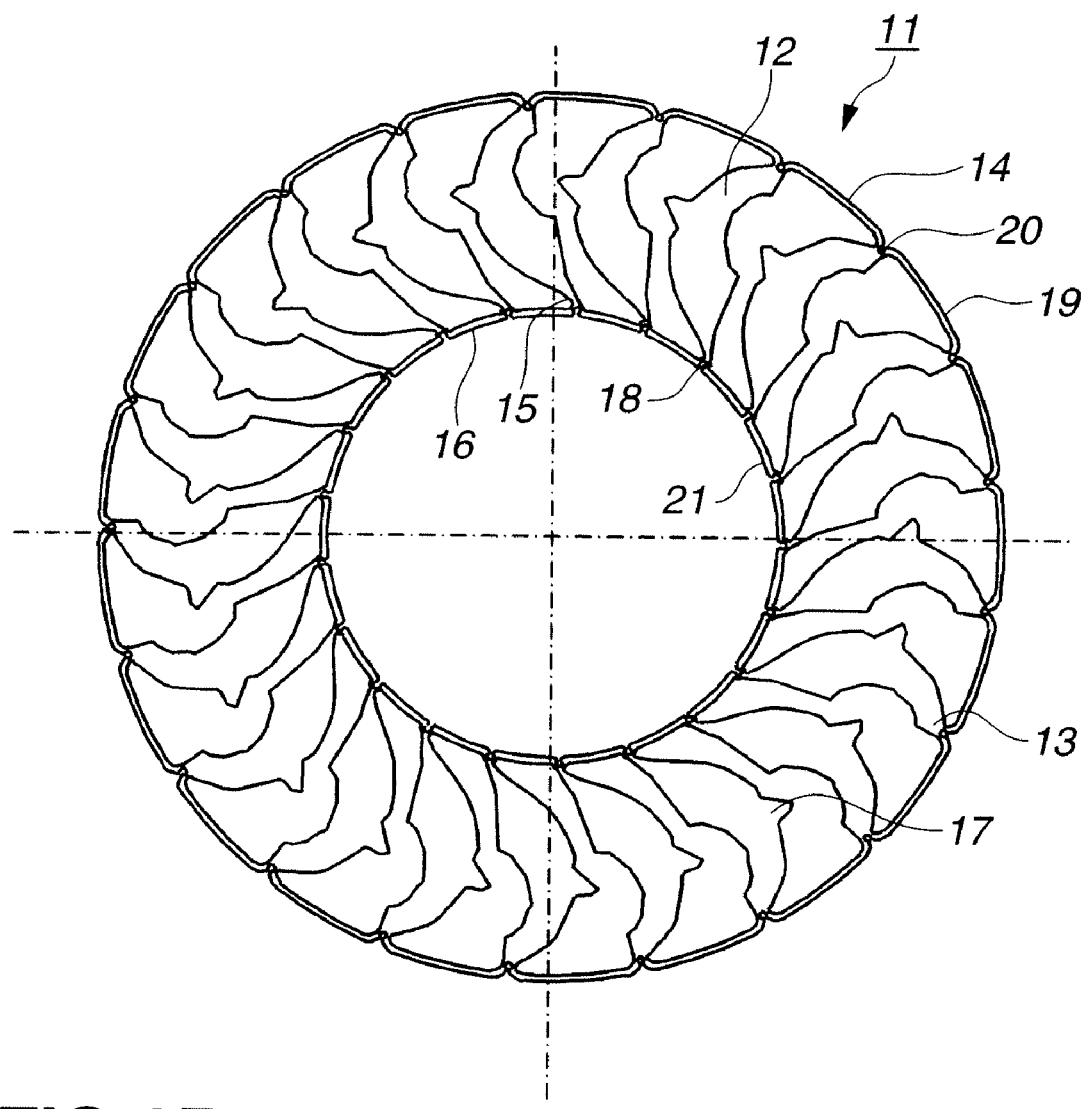
FIGS. 6A and 6B are respectively a front view of the blade structure and its sectional view.
Figure 6B:
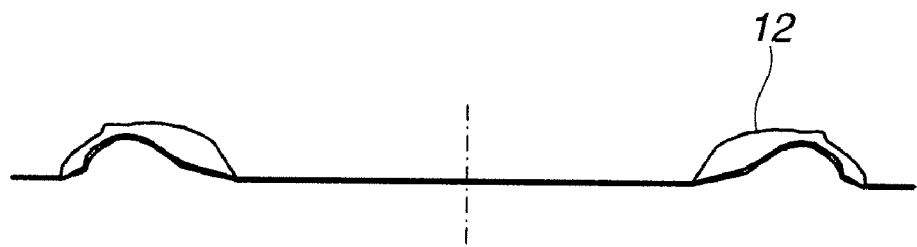
Figure 7A:
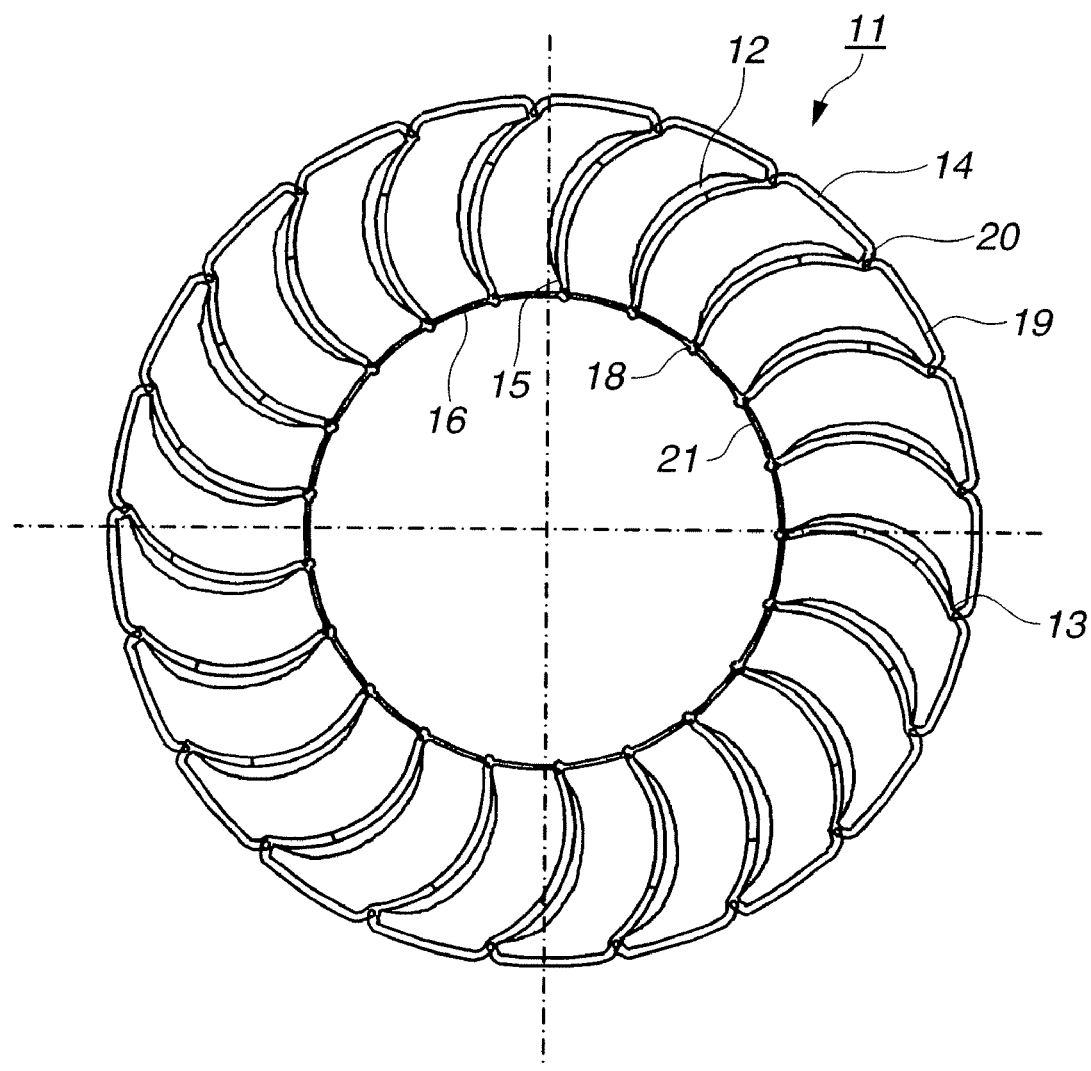
FIGS. 7A and 7B are respectively a front view of the blade structure and its sectional view.
Figure 7B:

As shown in FIG. 6B, in this process, a surface of blade 12 is curved so that blade 12 upheaves or swells out from bottom towards top in a vertical direction, of the plate member.

Here, at step S101, although blade structure 11 is slightly shrunk in the radial direction by this first bending process, the shape of the V-shaped portions of the first and second adjustment portions 20 and 18 slightly change, and then the first and second connecting portions 14 and 16 as a whole are not deformed and thereby hold the ring-shape of the blade structure 11.

At step S102, the second bending process is performed. In this process, by pressing the blade structure 11 using a die, blade 12 formed at step S101 is rotated with respect to first connecting portion 14 and second connecting portion 16, then the each blade 12 is inclined or tilted with respect to the circumferential direction of blade structure 11 (refer to FIGS. 7A and 7B). Through this process, an angle of blade 12 with respect to turbine shell 10, of the case where blade structure 11 is installed and fixed to turbine shell 10, is set.

In this second bending process, first adjustment portion 20 and second adjustment portion 18 are bent or folded at respective predetermined angles with respect to the circumferential direction in conjunction with the rotation of blade 12 (or by the rotation of blade 12). That is, first and second adjustment portions 20 and 18 are bent or folded while blade 12 is being rotated.

FIGS. 8A to 8C and 9 are drawings that explain states of first and second connecting portions 14 and 16 formed through the second bending process.

Figure 8A:
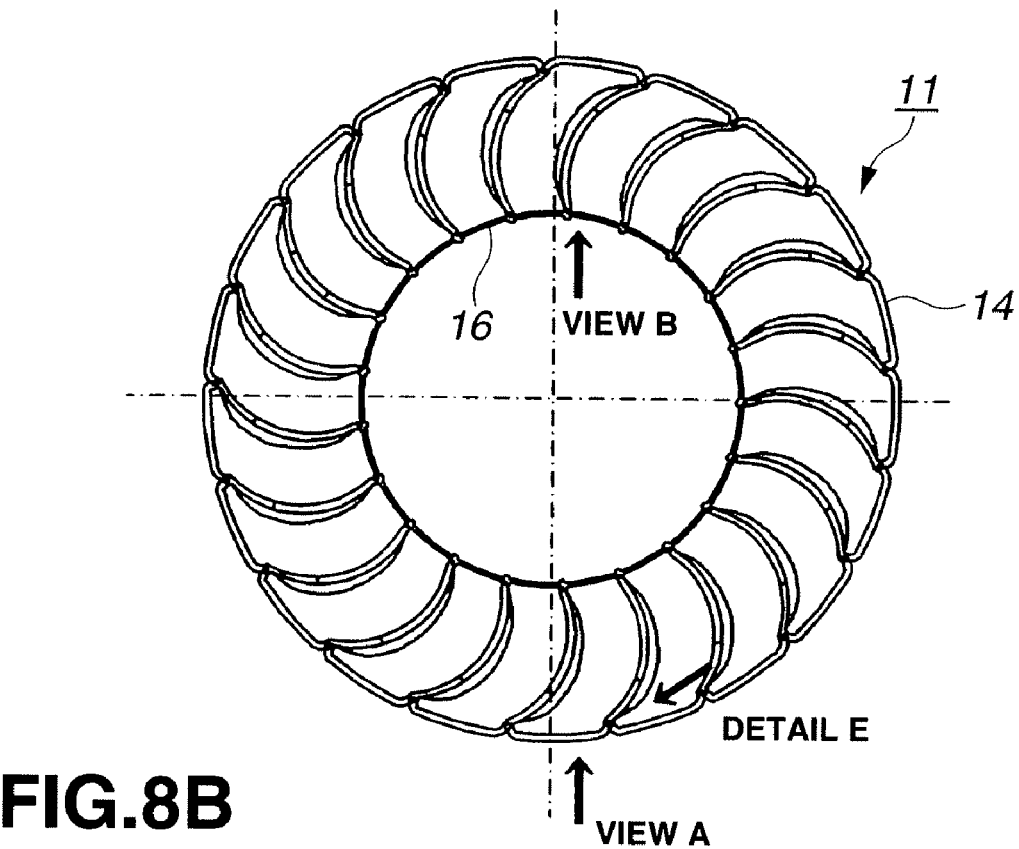
FIGS. 8A, 8B and 8C are respectively a front view of the blade structure and side views, viewed from A and B.
Figure 8B:
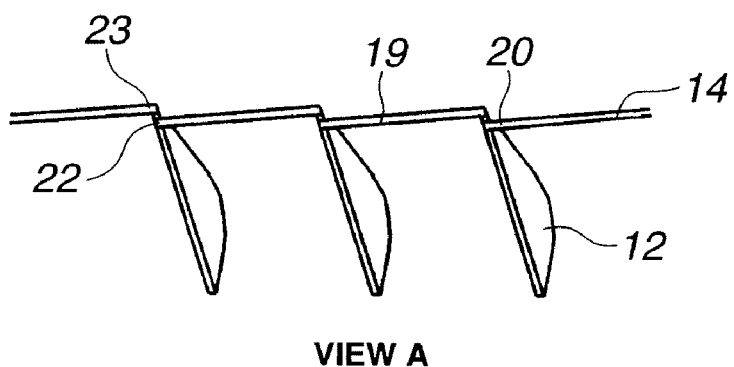
Figure 8C:
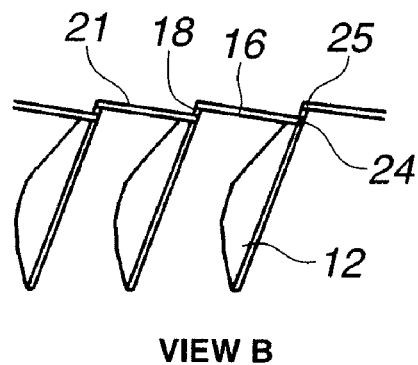
Figure 9:
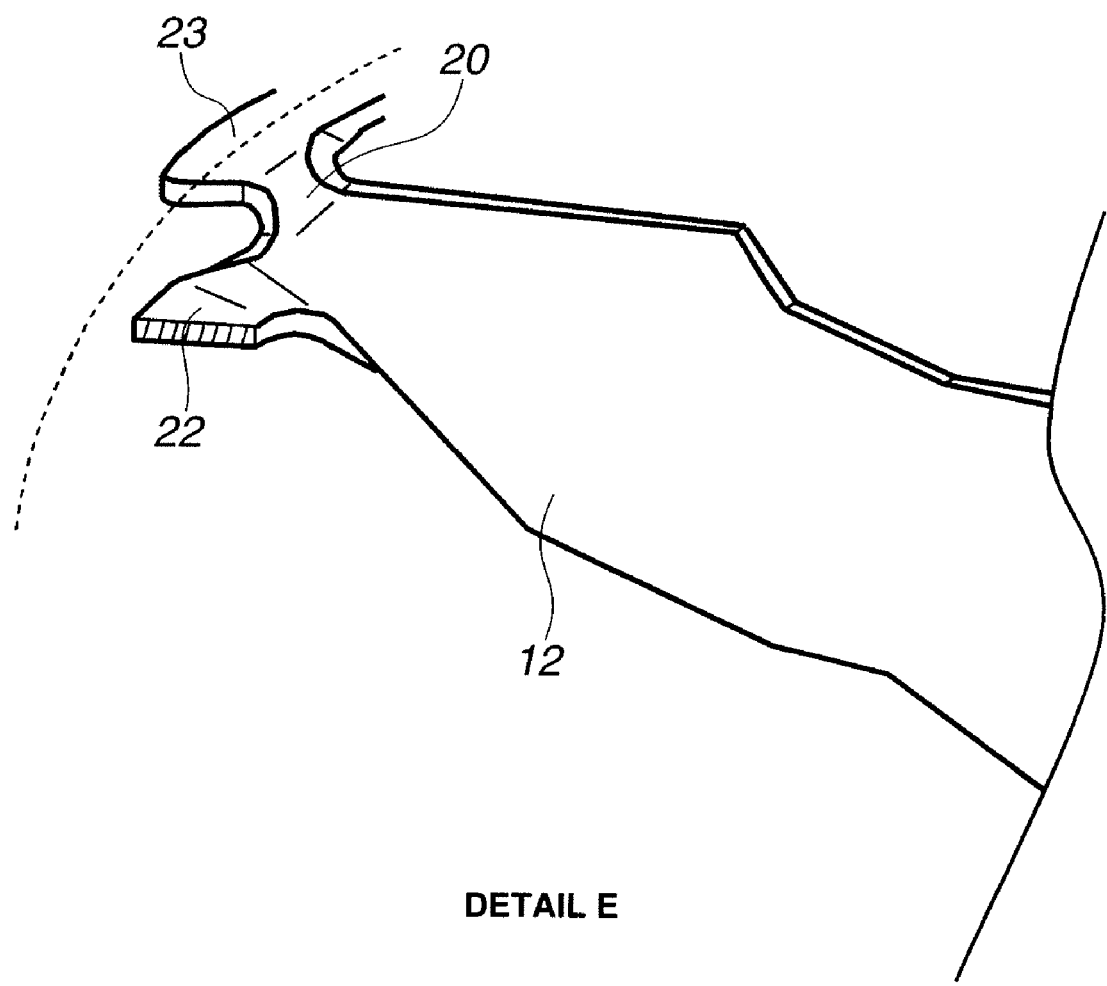
FIG. 9 is a perspective view showing a detail of the first connecting portion of the blade structure.

FIG. 8A shows a front view of blade structure 11 in the second bending process. FIG. 8B is a side view of first connecting portion 14, viewed from a first view point (VIEW A) in a horizontal direction. FIG. 8C is a side view of second connecting portion 16, viewed from a second view point (VIEW B) in the horizontal direction. FIG. 9 is a perspective view of an area of first adjustment portion 20 of first connecting portion 14, viewed from a third view point (DETAIL E).

As shown in FIG. 8B, first adjustment portion 20 is folded or bent at the same angle as the inclination of the blade 12 (i.e. at the angle of the slope rising to right in a counterclockwise direction with respect to a horizontal plane of blade structure 11) through the second bending process. At this time, the first and second branch portions 22 and 23 are shifted or moved, then first adjustment portion 20 is folded or bent (or deformed) at the same angle as the inclination of the blade 12.

First arc portion 19 of first connecting portion 14 is inclined at a slope rising to right in the counterclockwise direction with respect to the horizontal plane of blade structure 11, then is bent through the second bending process.

More specifically, first adjustment portion 20 is folded or bent so that first branch portion 22 overlaps second branch portion 23 below the second branch portion 23. Then by this overlap of the first and second branch portions 22 and 23 in the area of first adjustment portion 20, first connecting portion 14 is shortened in the circumferential direction.

In FIG. 9, this state is illustrated. In the area of first adjustment portion 20, first branch portion 22 is bent so that first branch portion 22 is positioned below the second branch portion 23 while blade 12 is being bent (or rotated) at the predetermined angle with respect to the horizontal plane of blade structure 11. In this state, there is a slight gap between these first branch portion 22 and second branch portion 23.

As described above, first arc portion 19 and first adjustment portion 20 are folded or bent by the predetermined angle with respect to the horizontal plane of blade structure 11, and also first adjustment portion 20 is folded or bent so that the first and second branch portions 22 and 23 overlap each other, then first connecting portion 14 is shortened in the circumferential direction and radial direction.

As for the area of second adjustment portion 18, as shown in FIG. 8C, second adjustment portion 18 is folded or bent at the same angle as the inclination of the blade 12 (i.e. at the angle of the slope rising to left in a clockwise direction with respect to the horizontal plane of blade structure 11) through the second bending process. At this time, the third and fourth branch portions 24 and 25 are shifted or moved, then second adjustment portion 18 is folded or bent (or deformed) at the same angle as the inclination of the blade 12.

Second arc portion 21 of second connecting portion 16 is inclined at a slope rising to left in the clockwise direction with respect to the horizontal plane of blade structure 11, then is bent through the second bending process.

More specifically, second adjustment portion 18 is folded or bent so that third branch portion 24 overlaps fourth branch portion 25 below the fourth branch portion 25. Then by this overlap of the third and fourth branch portions 24 and 25 in the area of second adjustment portion 18, second connecting portion 16 is shortened in the circumferential direction.

As described above, second arc portion 21 and second adjustment portion 18 are folded or bent by the predetermined angle with respect to the horizontal plane of blade structure 11, and also second adjustment portion 18 is folded or bent so that the third and fourth branch portions 24 and 25 overlap each other, then second connecting portion 16 is shortened in the circumferential direction and radial direction.

In this second bending process, the first and second connecting portions 14 and 16 are adjusted (shortened) to a desired diameter in the circumferential direction, and also the each distance between the adjacent blades 12 is adjusted or changed (shortened) to a desired distance. These desired diameter and distance are gained by adjusting the inclinations of the first and second arc portions 19, 21 and widths of overlap portion of the each branch portion of the first and second adjustment portions 20, 18.

Here, with regard to the first and second adjustment portions 20 and 18, the each adjustment portion does not necessarily have two branch portions. Any shape is possible as long as the first and second adjustment portions 20, 18 can be bent at the same angle as the inclination of blade 12 through the pressing. For instance, the first and second connecting portions 14 and 16 could have no branch and be formed into a ring shape.

In addition, the adjustment could be performed by bending only the first and second adjustment portions 20, 18 without inclining the first and second arc portions 19, 21.

At step S103, the third bending process is performed. In this process, by pressing etc., first connecting portion 14 and second connecting portion 16 are shrunk in the circumferential direction.

More specifically, first adjustment portion 20 is pressed so that the overlapping first and second branch portions 22 and 23 become closer to each other. Likewise, second adjustment portion 18 is pressed so that the overlapping third and fourth branch portions 24 and 25 become closer to each other.

Figure 10A:
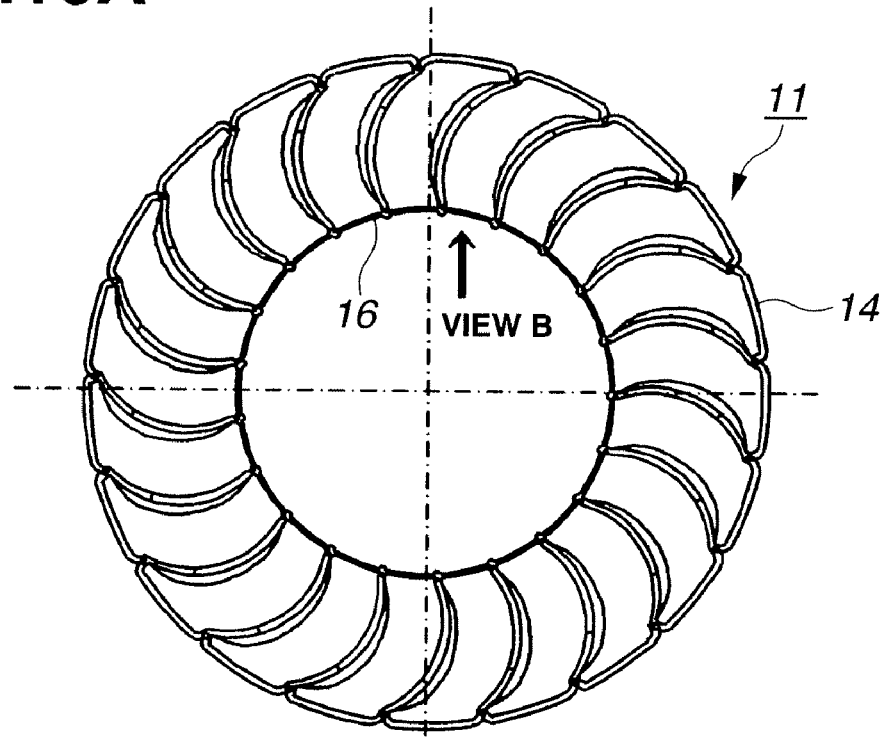
FIGS. 10A, 10B and 10C are respectively a front view of the blade structure and side views, viewed from A and B.
Figure 10B:
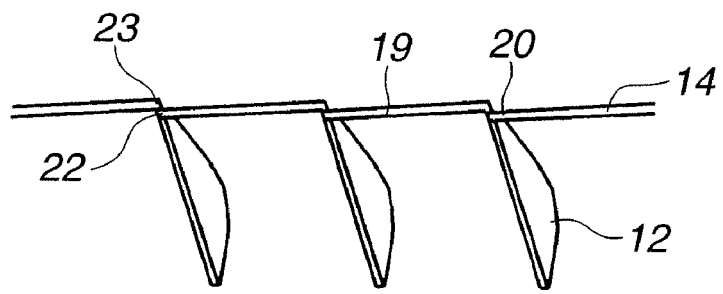
Figure 10C:
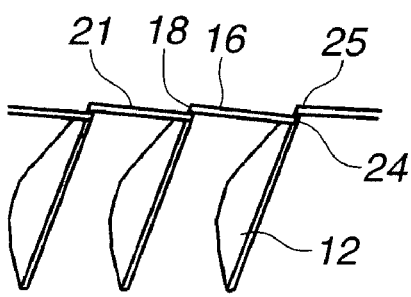

FIGS. 10A to 10C are drawings that explain states of first and second connecting portions 14 and 16 formed through the third bending process.

FIG. 10A shows a front view of blade structure 11 in the third bending process. FIG. 10B is a side view of first connecting portion 14, viewed from a first view point (VIEW A) in a horizontal direction. FIG. 10C is a side view of second connecting portion 16, viewed from a second view point (VIEW B) in the horizontal direction.

As shown in FIG. 10B, as mentioned above, first adjustment portion 20 is pressed so that the overlapping first and second branch portions 22 and 23 become closer to each other. Likewise, as shown in FIG. 10C, second adjustment portion 18 is pressed so that the overlapping third and fourth branch portions 24 and 25 become closer to each other.

The pressing is performed in this manner, first connecting portion 14 and second connecting portion 16 are further shrunk in the circumferential direction, and also the each distance between the adjacent blades 12 is shrunk (FIG. 10A).

Blade structure 11 formed in this way is installed and fixed to turbine shell 10. More specifically, as previously described, protrusion 17 of blade 12 is fitted into and fixed to the groove of turbine shell 10, and the position of blade 12 is settled with respect to turbine shell 10, then blade structure 11 is fixed to turbine shell 10 by the welding or soldering.

Here, as shown in FIGS. 10B and 10C, since first and second arc portions 19 and 21 incline, first connecting portion 14 and second connecting portion 16 respectively have a certain step in the circumferential direction. Thus it is desirable that shapes such as projections and depressions which correspond to the step should be preformed on an inner surface of turbine shell 10.

Through the above processes, blade structure 11, which is able to be easily installed to turbine shell 10, can be produced from the single plane plate.

Next, the effects of the embodiment will be explained.

In the above embodiment, blade 12 is integrally formed with first connecting portion 14 through first adjustment portion 20, and also is integrally formed with second connecting portion 16 through second adjustment portion 18, then blade structure 11 in which the plurality of the blades 12 are integrally formed with each other is produced. Hence, the plurality of the blades 12 can be installed to turbine shell 10 at once, and the assembly time can be shortened considerably. Furthermore, when installing blade structure 11 to turbine shell 10, an alignment between blade 12 and the groove provided in turbine shell 10 can be easily achieved. Therefore working efficiency can be improved upon the installation.

In addition, first connecting portion 14 has first adjustment portion 20 and first arc portion 19, and is folded or bent so that first and second branch portions 22 and 23 overlap each other in the area of first adjustment portion 20. And also first connecting portion 14 is formed so that first arc portion 19 has the predetermined angle with respect to the horizontal plane of blade structure 11. Likewise, second connecting portion 16 has second adjustment portion 18 and second arc portion 21, and is folded or bent so that third and fourth branch portions 24 and 25 overlap each other in the area of second adjustment portion 18. And also second connecting portion 16 is formed so that second arc portion 21 has the predetermined angle with respect to the horizontal plane of blade structure 11. Accordingly, by only pressing, the diameter of blade structure 11 can be shrunk, and also the distance between the adjacent blades 12 can be shrunk.

Moreover, blade 12 has protrusion 17 which protrudes from a contact surface between blade 12 and turbine shell 10 and is fitted into the groove formed in turbine shell 10. Therefore, when installing blade structure 11 to turbine shell 10, by fitting protrusion 17 into the groove, the positioning of blade 12 with respect to turbine shell 10 can be easily achieved. Consequently, the installation of blade structure 11 to turbine shell 10 becomes easy, and the working efficiency can be improved.

In the above embodiment, the case where blade structure 11 is installed to turbine shell 10 is explained. However, the above blade structure 11 could be applied to a case where blades are installed to an impeller shell (the rear cover 3).

This application is based on a prior Japanese Patent Application No. 2007-253537 filed on Sep. 28, 2007. The entire contents of this Japanese Patent Application No. 2007-253537 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A blade structure of a torque converter, having a plurality of blades circumferentially arranged at a predetermined distance, the blade structure produced according to processes comprising:
   (a) stamping a plane plate into a first shape, the first shape having:
      (i) the plurality of circumferentially arranged blades;
      (ii) ring-shaped first connecting portions, each of which integrally couples adjacent blades together at an outer circumference side of the blade structure; and
      (iii) ring-shaped second connecting portions, each of the ring-shaped second connecting portions integrally coupled the adjacent blades together at an inner circumference side of the blade structure;
   (b) curving a surface of a stamped blade between the first and second connecting portions;
   (c) inclining the stamped blade having the curved surface at a predetermined angle with respect to the first and second connecting portions while inclining the first and second connecting portions with respect to a horizontal plane of the plane plate; and
   (d) adjusting a distance between the adjacent blades and shrinking the first shape in a radial direction by inclination of the first and second connecting portions,
   wherein the first connecting portion includes:
      (i) a deformable first adjustment portion which has first and second branch portions and is integrally coupled with one of the blades through the first and second branch portions; and
      (ii) a first arc portion which integrally couples adjacent first adjustment portions together through the first and second branch portions,
   wherein a distance between the adjacent blades is adjusted by overlapping the first and second branch portions in a circumferential direction and inclining the first arc portion in the circumferential direction,
   wherein the second connecting portion includes:
      (i) a deformable second adjustment portion which has third and fourth branch portions and is integrally coupled with one of the blades through the third and fourth branch portions; and (ii) a second arc portion which integrally couples adjacent second adjustment portions together through the third and fourth branch portions, and wherein a distance between the adjacent blades is adjusted by overlapping the third and fourth branch portions in a circumferential direction and inclining the second arc portion in the circumferential direction.

2. The blade structure of the torque converter as claimed in claim 1, wherein:

the first and second branch portions of the first adjustment portion are substantially formed into a V-shape that opens outwards in a radial direction.

3. The blade structure of the torque converter as claimed in claim 1, wherein:

the third and fourth branch portions of the second adjustment portion are substantially formed into a V-shape that opens inwards in a radial direction.

4. The blade structure of the torque converter as claimed in claim 1, wherein the blade structure is installed into a shell member, and wherein one of the blades has a protrusion for fixing a position of the one of the blades to the shell member upon the installation.

\* \* \* \* \*